United States Patent
Rathgeber et al.

(10) Patent No.: US 10,437,777 B2
(45) Date of Patent: *Oct. 8, 2019

(54) PROCESSES TO BETTER SUPPORT DEFENSIBLE DISPOSAL IN RECORDS MANAGEMENT

(71) Applicant: International Business Machines Corporation, Armonk, NY (US)

(72) Inventors: Ronald L. Rathgeber, Tustin, CA (US); Jeffrey L. Wallace, Costa Mesa, CA (US); Li Zhou, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/622,149

(22) Filed: Feb. 13, 2015

(65) Prior Publication Data
US 2015/0310025 A1    Oct. 29, 2015

Related U.S. Application Data

(63) Continuation of application No. 14/261,158, filed on Apr. 24, 2014.

(51) Int. Cl.
*G06F 16/11* (2019.01)
(52) U.S. Cl.
CPC ................... *G06F 16/125* (2019.01)
(58) Field of Classification Search
CPC .................................................. G06F 16/125
IPC ...................................................... G06F 16/11
See application file for complete search history.

(56) References Cited

U.S. PATENT DOCUMENTS

| | | |
|---|---|---|
| 7,689,563 B1 | 3/2010 | Jacobson |
| 8,812,464 B2 | 8/2014 | Sambamurthy et al. |
| 8,812,646 B1 | 8/2014 | Zhang et al. |
| 9,298,707 B1 | 3/2016 | Zhang et al. |
| 2006/0156382 A1 | 7/2006 | Motoyama |
| 2007/0038683 A1* | 2/2007 | Dixon ............... G06Q 10/06 |
| 2007/0094311 A1 | 4/2007 | Pelletier et al. |
| 2007/0239715 A1 | 10/2007 | DeBie |
| 2009/0070324 A1 | 3/2009 | Yoshino |

(Continued)

FOREIGN PATENT DOCUMENTS

| | | |
|---|---|---|
| WO | 201136773 A1 | 11/2011 |
| WO | 2011136773 A1 | 11/2011 |

OTHER PUBLICATIONS

Zhu, W-D. et al., Understanding IBM FileNet Records Manager, IBM Redbooks, May 2009, pp. 1-106, IBM Corporation, Armonk, United States.

(Continued)

*Primary Examiner* — Amresh Singh
(74) *Attorney, Agent, or Firm* — Patterson + Sheridan, LLP (57) ABSTRACT

Embodiments presented herein provide techniques for enforcing a document retention policy that uses defensible disposal processes. According to one embodiment, a records management system identifies a set of records in a container that is scheduled for deletion on a specified date according to a retention policy. The records management system generates one or more reports listing the records and information associated with the records. The records management system performs a deletion workflow to remove the records listed in the report.

20 Claims, 6 Drawing Sheets

(56) References Cited

U.S. PATENT DOCUMENTS

| | | | | |
|---|---|---|---|---|
| 2009/0299907 | A1* | 12/2009 | Cofano | G06Q 30/02 705/80 |
| 2011/0205576 | A1 | 8/2011 | Halron et al. | |
| 2012/0130953 | A1 | 5/2012 | Hind et al. | |
| 2013/0325822 | A1* | 12/2013 | Sambamurthy | G06Q 30/0201 707/694 |
| 2015/0278482 | A1* | 10/2015 | Mattera | G06F 19/3487 705/3 |

OTHER PUBLICATIONS

Zhu, W-D. et al., Understanding IBM FileNet Records Manager, IBM Redbooks, May 2009, pp. 107-364, IBM Corporation, Armonk, United States.

Zhu, W-D. et al., Understanding IBM FileNet Records Manager, IBM Redbooks, May 2009, pp. 365-414, IBM Corporation, Armonk, United States.

Zhu, W-D. et al., Creating Value-Based Archiving Solutions with IBM Content Collector, IBM Redbooks, IBM Corporation, Jan. 2013, pp. 1-82 , IBM Corporation, Armonk, United States.

Zhu, W-D. et al., Creating Value-Based Archiving Solutions with IBM Content Collector, IBM Redbooks, IBM Corporation, Jan. 2013, pp. 83-188 , IBM Corporation, Armonk, United States.

Zhu, W-D. et al., Creating Value-Based Archiving Solutions with IBM Content Collector, IBM Redbooks, IBM Corporation, Jan. 2013, pp. 189-290 , IBM Corporation, Armonk, United States.

Rathgeber et al.: "Processes to Better Support Defensible Disposal in Records Management"; U.S. Appl. No. 14/261,158, filed Apr. 24, 2014; IBM Docket No. SVL920140009US1.

Olston, C.; "Method and System for Handling Evolving Workflows"; An IP.com Prior Art Database Technical Disclosure; http://ip.com/IPCOM/000197161D; Jun. 25, 2010.

\* cited by examiner

| REPORT 400 | | | |
|---|---|---|---|
| | | ID: | 46 |
| | PROPERTY TRIGGER: | | Contract close |
| | DISPOSAL DATE: | | 03/21/2015 |
| | REVIEWER: | | legal@abc-comp.org |

| ID | FILENAME | DESCRIPTION | LOCATION |
|---|---|---|---|
| 12 | gyrrzz.doc | ~~~ | Omaha |
| 13 | ssdqqd.rtf | ~~~ | New York City |
| 16 | fqqedf.doc | ~~~ | New York City |
| 21 | qwfsfds.doc | ~~~ | Akron |
| 25 | sefsbb.docx | ~~~ | Omaha |
| 29 | awefgsdgf.doc | ~~~ | Akron |
| 30 | gyrawrzz.doc | ~~~ | Akron |
| 33 | awfdsfx.doc | ~~~ | Akron |
| 34 | awdgewsg.doc | ~~~ | New York City |
| 35 | sefseghe.doc | ~~~ | Cheyenne |
| 42 | esgegges.doc | ~~~ | Cheyenne |
| 48 | esghrhns.doc | ~~~ | Akron |
| 63 | seggesss.doc | ~~~ | Omaha |
| 66 | segegsgs.doc | ~~~ | Omaha |
| 71 | sesgevvv.doc | ~~~ | Montpelier |

PROCESSES TO BETTER SUPPORT DEFENSIBLE DISPOSAL IN RECORDS MANAGEMENT

CROSS-REFERENCE TO RELATED APPLICATION

This application is a continuation of co-pending U.S. patent application Ser. No. 14/261,158 filed Apr. 24, 2014. The aforementioned related patent application is herein incorporated by reference in its entirety.

BACKGROUND

In records management systems, defensible disposal is an information governance process where content of a regulated entity is systematically deleted with an audit trail that is based on retention policies. The process may include electronically capturing content, applying retention policies to the content, and disposing content according to a retention schedule, while retaining content on litigation hold. Adhering to defensible disposal policies allows an enterprise to demonstrate, for legal purposes, that any action taken to destroy or delete documents (or other records) is performed in good faith.

Traditional records management systems typically classify content and aggregate related content as records. Further, the records may be stored in containers. Each container is assigned a disposition schedule based on retention policies. For instance, consider a container storing contracts maintained by an enterprise. As an example, a disposition schedule could specify that records in the container should be disposed of three years after a contract close date indicated in the record. The records management system, on a periodic basis (e.g., once a day), may perform disposition processes that queries every container for all records to be deleted, based on retention policies. Once the processes determine that records are scheduled to be deleted, the records management system notifies a reviewer, who then approves or rejects the deletion. The records management system disposes the records after receiving a decision from the reviewer.

SUMMARY

According to one embodiment of the present invention, records in a container are identified. The identified records are subject to deletion following a date specified by a document retention policy. A first report listing the identified records and information associated with one or more of the identified records is generated. The information includes at least a filename, a location, and a description. The first report is associated with an identifier. A workflow is initialized to delete the records listed in the first report. The workflow may include forwarding the first report to a reviewer authorized to place a deletion hold on any of the records listed in the first report. Upon reaching the specified date and determining that the document retention policy has not been modified since the first report was generated, each record listed in the first report that does not have a deletion hold is deleted.

Another embodiment includes a system having a processor and a memory storing a program, which, when executed on the processor, performs an operation for enforcing a document retention policy. This operation may generally include identifying records in a container subject to deletion following a date specified by a document retention policy and generating a first report listing the identified records and information associated with one or more of the identified records. The information includes at least a filename, a location, and a description, wherein the first report is associated with an identifier. This operation may also include initializing a workflow to delete the records listed in the first report.

Still another embodiment includes a computer program product comprising a computer-readable storage medium having computer-readable program code embodied therewith, the computer-readable program code configured to perform an operation for enforcing a document retention policy. This operation may generally include identifying records in a container subject to deletion following a date specified by a document retention policy and generating a first report listing the identified records and information associated with one or more of the identified records. The information includes at least a filename, a location, and a description, wherein the first report is associated with an identifier. This operation may also include initializing a workflow to delete the records listed in the first report.

DETAILED DESCRIPTION

Traditional records management systems that provide disposal processes that individually determine and set disposition properties (e.g., disposal date, document sources, hold status, etc.) for each record that is subject to a given disposition schedule. For example, assume that a container stores one million records corresponding to contracts, where the disposition schedule specifies that the each record in the container is to be deleted ten years after the closing date. The process calculates the disposition properties of each record in the container to determine which records are to be disposed at a given time. Further, assume the process calculates properties for each one of the one million records and determines that one thousand should be destroyed in a following disposition cycle.

Continuing the example, if the disposition schedule is modified during this time, the records management system must individually update every record with the latest disposition properties. Doing so creates significant overhead. In addition, an individual reviewing a records container (e.g., a human resources coordinator, an information technology manager, etc.) typically has no way to know which records are scheduled to be deleted at any given time, unless the reviewer examines the records individually. That is, traditional disposition processes do not provide a convenient way for a reviewer to know what individual records are scheduled to be destroyed on a particular day.

Further, traditional disposition processes often provide an approval step that a reviewer must complete before the processes can delete records scheduled to be deleted. For instance, when a set of records from a particular container is scheduled to be deleted several days in advance, the records management system may notify the reviewer about the upcoming deletion. The reviewer then needs to either approve or reject the deletion before the record management system can proceed. One concern is that the approval step can remain without a decision from the reviewer far beyond the retention deadline, resulting in weak adherence to the retention policy, which may cause a variety of problems.

Embodiments presented herein provide techniques for enforcing a defensible disposal policy in a records management system. In one embodiment, a records management system retrieves records set to expire within a period specified by the policy. The records management system generates a report that includes all of the record to be disposed after the period of time elapses. The report provides information specific to each record for a reviewer to examine (e.g., document names, identifiers, where each document was retrieved from, etc.).

After generating the report for a particular set of records, the records management system initiates a deletion workflow for those records. Once initiated, the workflow provides a period for the reviewer to determine whether to hold any of the records past the retention schedule (e.g., if the document is currently subject to a litigation hold) or to modify the document retention schedule. If the review period expires without any action from the reviewer, the records management system deletes all of the applicable records once the retention period expires and generates a report of all of the deleted records. If the reviewer decides to place certain records on hold, the records management system deletes the remaining records normally but also generates a report specifying the records not deleted because of the hold. Further, if the reviewer decides to modify the retention schedule for the set of records, the records management generates a report specifying the change in the retention schedule.

Advantageously, the record disposition techniques described herein ensure that an enterprise adheres to document retention policies. For instance, by proceeding with a deletion regardless of whether the reviewer completes a review (rather than wait for the reviewer to either approve or reject the deletion), techniques ensure that records scheduled to be deleted at a certain time are deleted at that time. The records management system also documents any hold or change in retention policies. Further, any reports generated by the records management system may serve as audit records for the enterprise. In addition, the enforcement techniques provide a more scalable solution than traditional disposal techniques. One reason is that rather than passing identifiers of individual records of a container to a deletion workflow, the records management system instead passes an identifier of the generated disposition report to the workflow to simplify the process.

Figure 1:
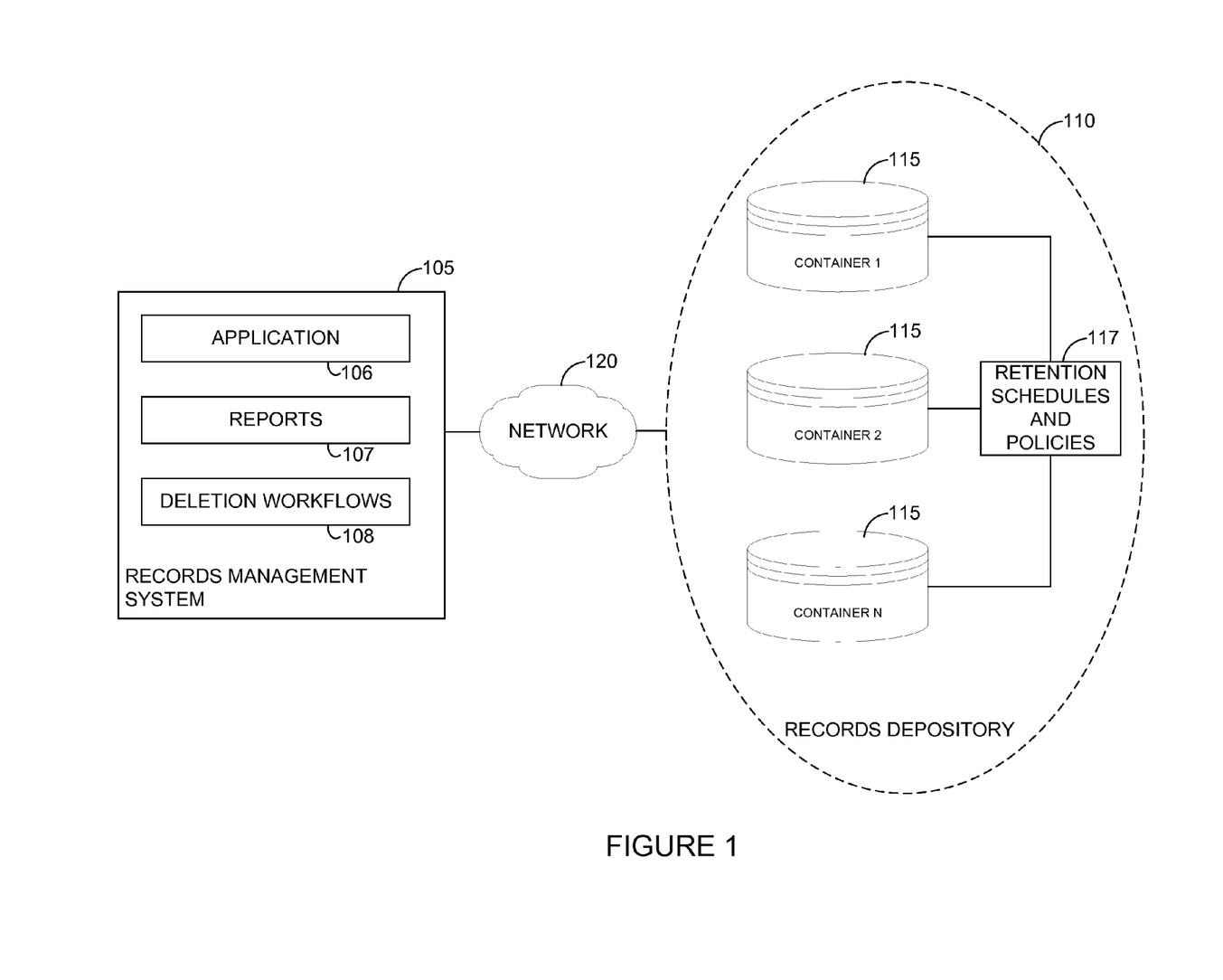
FIG. 1 illustrates an example computing environment, according to one embodiment.

FIG. 1 illustrates an example computing environment 100, according to one embodiment. As shown, the computing environment 100 includes a records management system 105 connected to a records depository 110 via a network 120. The records management system 105 may be a physical computing system (e.g., a system in a data center) or may be a virtual computing instance executing within a computing cloud. In one embodiment, the records management system 105 may belong to an enterprise, and the records depository 110 may correspond to enterprise documents and other records captured and stored by the records management system 105.

Illustratively, the records depository 110 includes multiple containers 115 that store enterprise records. The records may be stored in containers 115 based on record categories. For example, one container 115 may store records pertaining to human resources documents, while another container 115 may store records pertaining to legal documents. Each container 115 is subject to retention schedules and policies 117 of the enterprise. The retention schedules and policies 117 specify attributes that allow the records management system 105 to evaluate whether properties of each record (e.g., deletion dates, chain of command, and the like) adhere to the policies 117. The retention schedules and policies 117 also specify an event-based retention period for each record. For instance, contract records stored in a container 115 may be subject to a retention period based on a closing date of the contract. Further, a document retention reviewer may be assigned to a container 115 to ensure that disposal processes are carried out according to the retention schedules and policies 117. For example, a human resources manager may assigned as a reviewer for a container 115 that stores human resources documents, and an information technology manager may be assigned as a reviewer for a container 115 that stores information technology documents.

Generally, the records management system 105 is configured to manage the records in the records depository 110. The records management system 105 may contain applications for tracking and storing records of the enterprise. In one embodiment, the records management system 105 includes application 106, document retention reports 107, and deletion workflows 108. The application 106 generates the document retention reports 107 for records in a container 115 that are scheduled to be deleted after a specified time period (e.g., thirty days, three months, etc.) elapses. A document retention report 107 lists document records per a container that are subject to be deleted based on the retention schedules and policies 117. After generating a document retention report 107 for applicable records in a given container 115, the application 106 initiates a deletion workflow 108 for the records. The deletion workflow 108 provides a reviewer a specified period of time to review a generated document retention report 107 and determine whether to place any of the records listed in the report 107 on hold (e.g., because of ongoing litigation) or to modify the retention schedules and policies 117 of the container 115 associated with the policies 117 (e.g., by setting the retention period from ten years to twelve years). On the disposal date, the deletion workflow 108 deletes any records not placed on hold and not subject to changes in the corresponding retention schedules and policies 117. The deletion workflow 108 generates reports of records deleted and records that were not deleted (e.g., because of a hold placed on the record or because of a change in one of the policies 117).

The application 106 may be implemented as a task manager service that may be scheduled to execute on a specified periodic basis (e.g., once a day). More specifically, the application 106 may be configured to generate reports for records scheduled to expire and initiate deletion workflows at intervals specified, e.g., by an administrator. Doing so ensures that the records management system 105 regularly identifies records that are to be disposed according to the policies 117.

Figure 2:
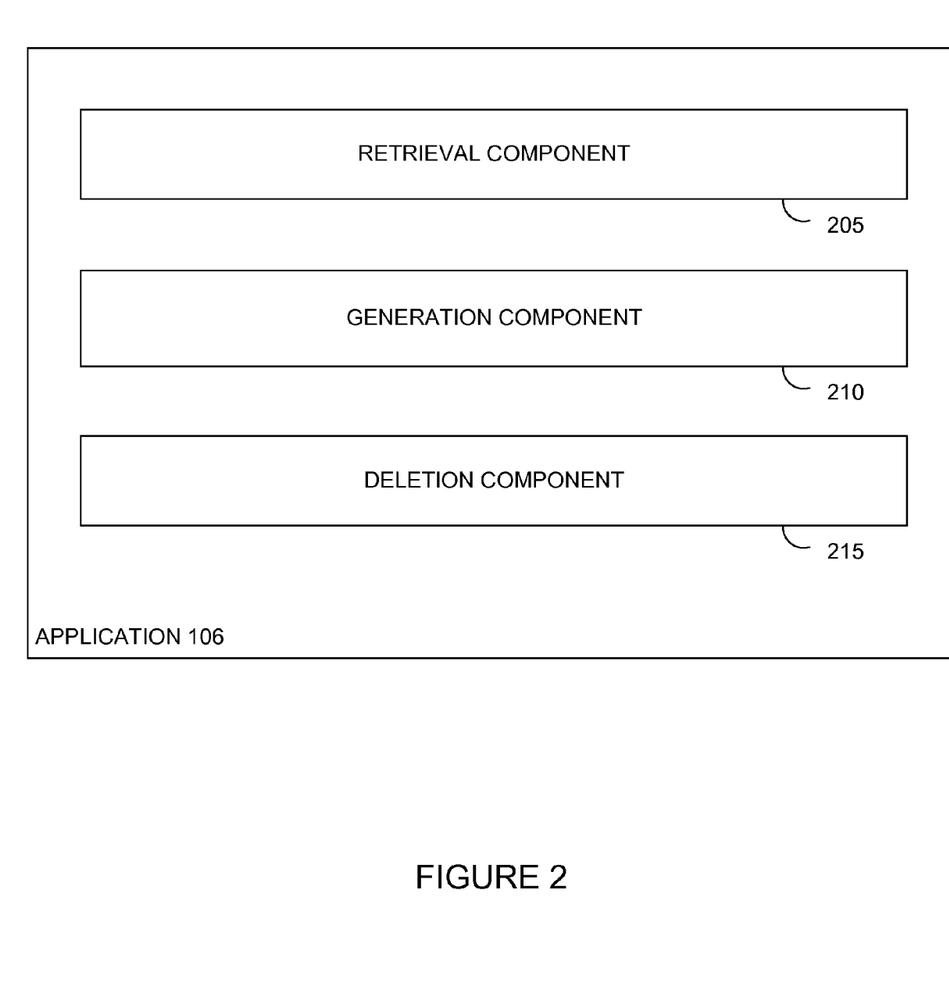
FIG. 2 illustrates an example application configured to generate document retention reports and perform deletion workflows, according to one embodiment.

FIG. 2 further illustrates the application 106, according to one embodiment. As shown, the application 106 includes a retrieval component 205, a generation component 210, and a deletion component 215. In one embodiment, the retrieval component 205 obtains records and information pertaining to each record (e.g., record ID's, container source information, retention trigger properties) from the containers 115 in advance of a disposal date according to an associated policy 117. The advance period may be a configurable value (e.g., five days in advance, one month in advance, three months in advance, etc.).

Figure 4:
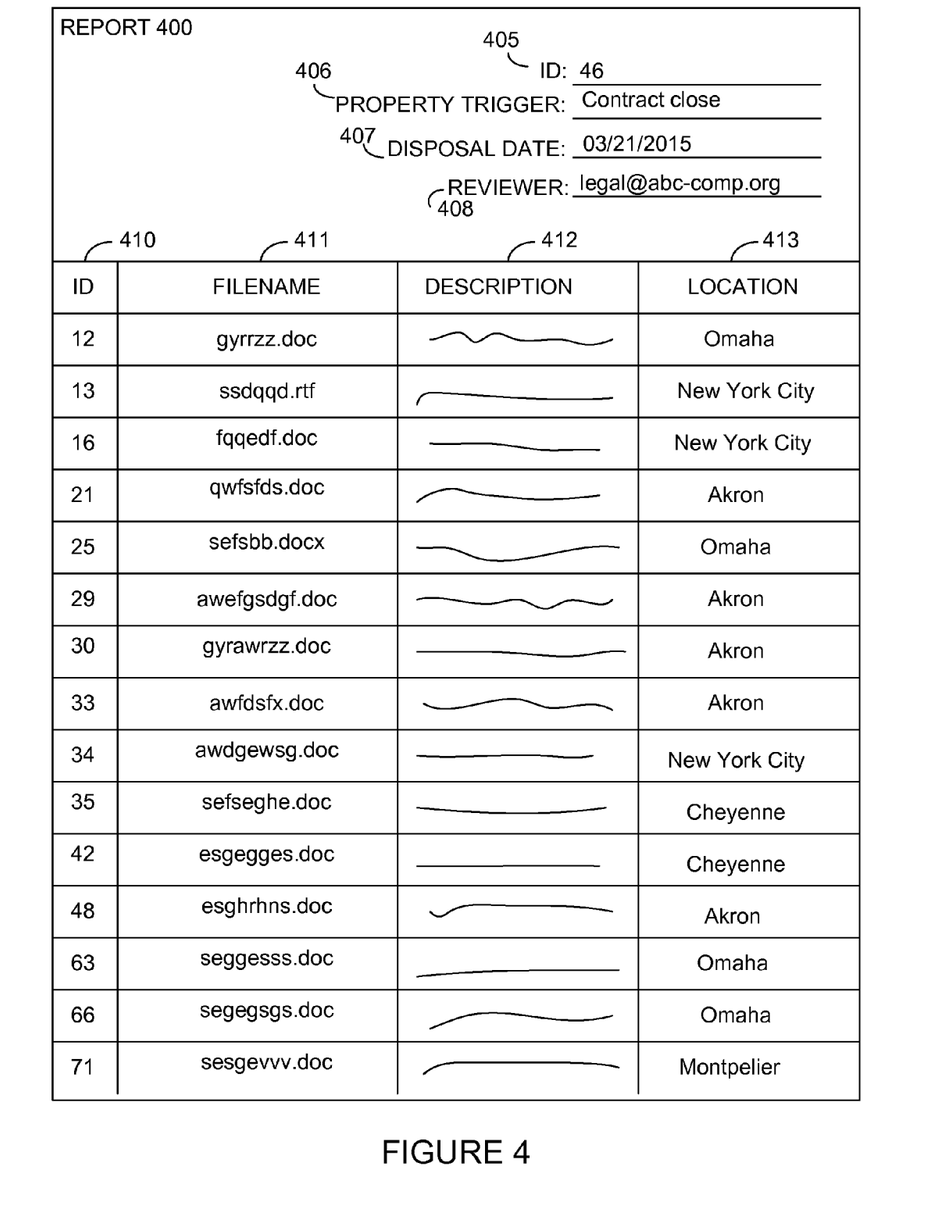
FIG. 4 illustrates an example report that lists records to be disposed after retention period elapses, according to one embodiment.

The generation component 210 creates different types of reports for the records management system 105. For example, the generation component 210 creates a document retention report based on the records obtained by the retrieval component 205. The application 106 may organize the report based on a reviewer for a container storing such records. That is, all records assigned to a particular reviewer may be included in a single report. Each report includes a listing of the records scheduled to be deleted on a certain date as well as other information associated with the records. Such information may include a record identifier, file name, description, document source information, and the like. In addition, each generated report includes a globally unique identifier (GUID) used by the deletion component 215. FIG. 4 further illustrates an example document retention report generated for a container 115. The generation component 210 may forward the report to one or more reviewers (e.g., as an e-mail attachment, via a console display, etc.) to evaluate.

After the generation component 210 creates a document retention report for a set of records, the deletion component 215 may initiate a deletion workflow. If a reviewer has not modified any policies pertaining to the records listed in the report, then at the disposal due date (i.e., the date in which the records are scheduled to be deleted), the deletion component 210 disposes the records listed in the report that have not been placed on hold by a reviewer of the report. To dispose the records, the deletion component 210 parses the report to identify the records set for deletion and subsequently removes the records from the container. The deletion component 210 may dispose the records according to the policy 117 associated with the records. Once the deletion workflow has completed, the deletion component 210 may notify the generation component 210 of the records from the document retention report that have been deleted and the records that were not deleted. In turn, the generation component 210 creates reports for records that were deleted and records that were not deleted by the workflow. The generation component 210 may forward the report to the reviewer to examine.

Figure 3:
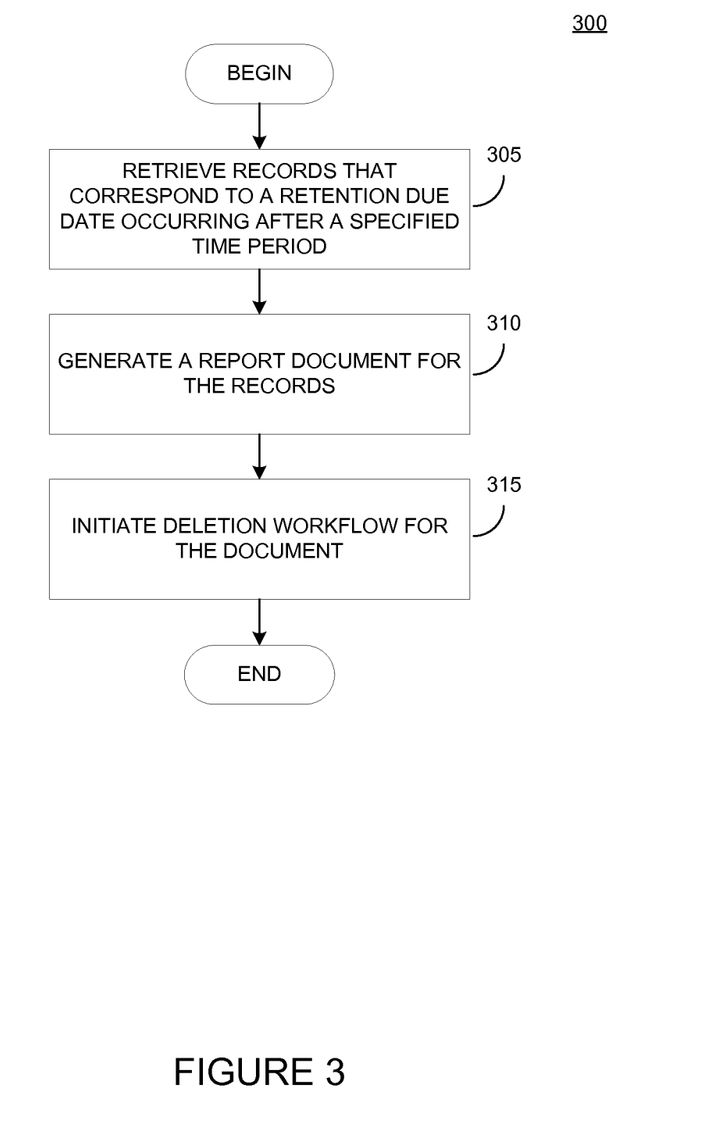
FIG. 3 illustrates a method for generating a document retention report, according to one embodiment.

FIG. 3 illustrates a method 300 for generating a document retention report for a container in a records management system, according to one embodiment. The retrieval component 205 executes a query to obtain, from the records depository, containers that are associated with valid retention policies. The application 106 performs method 300 on each individual container.

At step 305, the retrieval component 205 obtains a set of records from the container scheduled to expire after a specified time period elapses. To do so, the retrieval component 205 may execute a query that specifies record property types and disposal dates according to an associated retention policy and the specified period as query conditions. For example, assume that a container stores contract records and is associated with a retention policy that requires all records in the container to be deleted ten years after close of the contract. Further, assume that the specified period is thirty days prior to the disposal date. The retrieval component 205 specifies as conditions records having a "contract close date" record property type and expiring in thirty days. Doing so results in the retrieval component 205 obtaining records that conform to those conditions.

At step 310, the generation component 210 parses each of the retrieved records for information and produces a document retention report based on the information. Such information may include an identifier of a record, a filename of the record, record descriptions, source locations, and so on. The report is also assigned a GUID. Once generated, the application 106 forwards the document retention report to a reviewer assigned to evaluate the report. An enterprise with many departments may assign different reviewers to different records containers. For instance, in the previous example, an individual (or group of individuals) in the enterprise's legal department may be responsible for reviewing the reports generated by the application 106.

At step 315, the deletion component 215 initiates a deletion workflow instance to associate with the generated report. The deletion component 215 passes information to the workflow instance that includes the report GUID, the specified period, contact information of the reviewer (e.g., e-mail address), and the like. The deletion workflow is further described in FIG. 5.

FIG. 4 illustrates an example document retention report 400 generated by application 106, according to one embodiment. After the generation component 210 creates the report 400 for a given container, the application 106 may forward the report 400 to a reviewer associated with the container. Illustratively, the report 400 provides information about records scheduled to be disposed as well as information about the report 400 itself. The record may be presented in any number of formats, such as a spreadsheet, word processor document, and the like.

The report 400 includes an identifier field 405, which specifies an identifier for the report 400. The identifier may be a globally unique identifier (GUID). Further, the report 400 may include a record property trigger field 406, which represents an event associated with the record that triggers the deletion of the record according to the policy. Illustratively, the record property trigger specified in field 406 is a contract closing date. That is, records in the container are to be disposed after a specified period of time after the closing date of the record. The disposal date field 407 specifies the date in which the records management system is to delete the records to adhere to the policy. The report 400 may also provide a reviewer field 408 that specifies a reviewer that is responsible for examining the report 400. The reviewer field 408 in the report 400 may specify an e-mail address to which the generation component 215 forwards the report 400. Alternatively, the reviewer field may also be a directory name or a name of a reviewing individual.

The report 400 provides a listing of records in the container that are scheduled to expire on the disposal date specified in field 407. Illustratively, the records are listed by row and in order of record identifiers 410. The record identifiers 410 may be GUIDs. Each row also includes a record filename 411, a record description 412, and a record location 413. The record filename 411 is a reference name of the record. The record description 412 provides specified descriptions and metadata associated with the record. The record location 413 specifies where a corresponding record originated. For instance, the record location 413 may specify locations in the case where an enterprise has offices in separate national or worldwide locations. Alternatively, the location 413 may specify the department name where the record originated.

As stated, a reviewer examines the report 400 to determine whether any records listed in the report should be placed on hold instead of deleted. The reviewer may also modify the retention policy associated with the records to change the disposition date. In either case, the application 106 may generate an additional report corresponding to records not deleted on the disposition date listed in the report 400. Doing so provides an additional audit record that provides reasons why certain records were not deleted on the scheduled disposition date (e.g., because the reviewer placed the record on hold, because the reviewer modified the retention policy, etc.).

Figure 5:
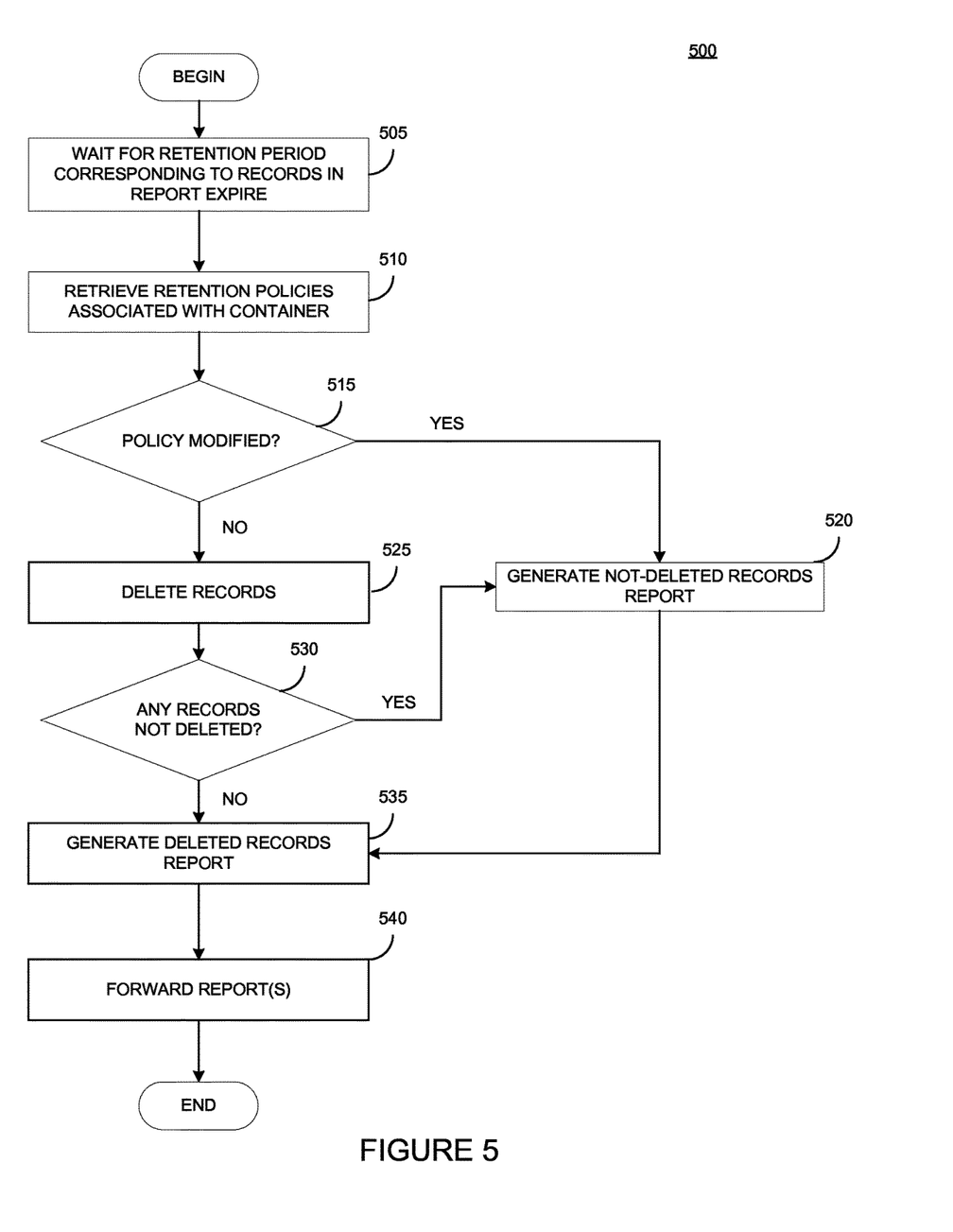
FIG. 5 illustrates a method for deleting content records after a retention period has elapsed, according to one embodiment.

FIG. 5 illustrates a method for deleting content records after a retention period has elapsed, according to one embodiment. As stated, once a document retention report is generated, the application 106 initiates a deletion workflow to associate with the report. The workflow takes as parameters the GUID of the report, the specified advance period, the reviewer information and the like.

At step 505, the application 106 waits for a period between the report generation and the disposal date to elapse. During this period, a reviewer may evaluate the document retention report and decide whether to place any records listed in the report on hold. In addition, the reviewer may modify the retention policy associated with the container.

Once the wait period elapses, at step 510, the retrieval component 205 obtains the retention policy associated with the container. Note that the deletion workflow proceeds even if the reviewer has not evaluated the document retention report. Doing so ensures that records scheduled to be disposed at a certain date are deleted rather than held at a review stage that must be completed before deleting the records.

At step 515, the application 106 determines whether the retention policy has been modified. If so, then the deletion component 215 does not delete any of the affected records. Instead, the generation component 210, at step 520, generates a separate report that indicates the records that were not deleted and the reason for not deleting the records (e.g., because of a change in the retention policy).

At step 525, the deletion component 215 disposes the records unaffected by changes to the retention policy. The deletion component 215 removes the records from the container and the records depository according to retention policies of the container. During deletion, if any record is unable to be deleted (e.g., because of a hold or some other reason), the generation component 210 may generate a separate report that lists the records that were not deleted and a reason for not deleting the records. At step 530, the application 106 determines whether any records were not deleted from the container and records depository (e.g., because of a hold). If so, at step 520, the generation component 210 generates a not-deleted records report listing the records not deleted and reasons of why the records were not deleted. At step 535, the generation component 210 generates a report that specifies all records deleted by the deletion component 215. At step 540, the application 106 forwards the report of deleted records (as well as any reports for records that were not deleted) to the reviewer. The records may serve as audit records for the enterprise.

Figure 6:
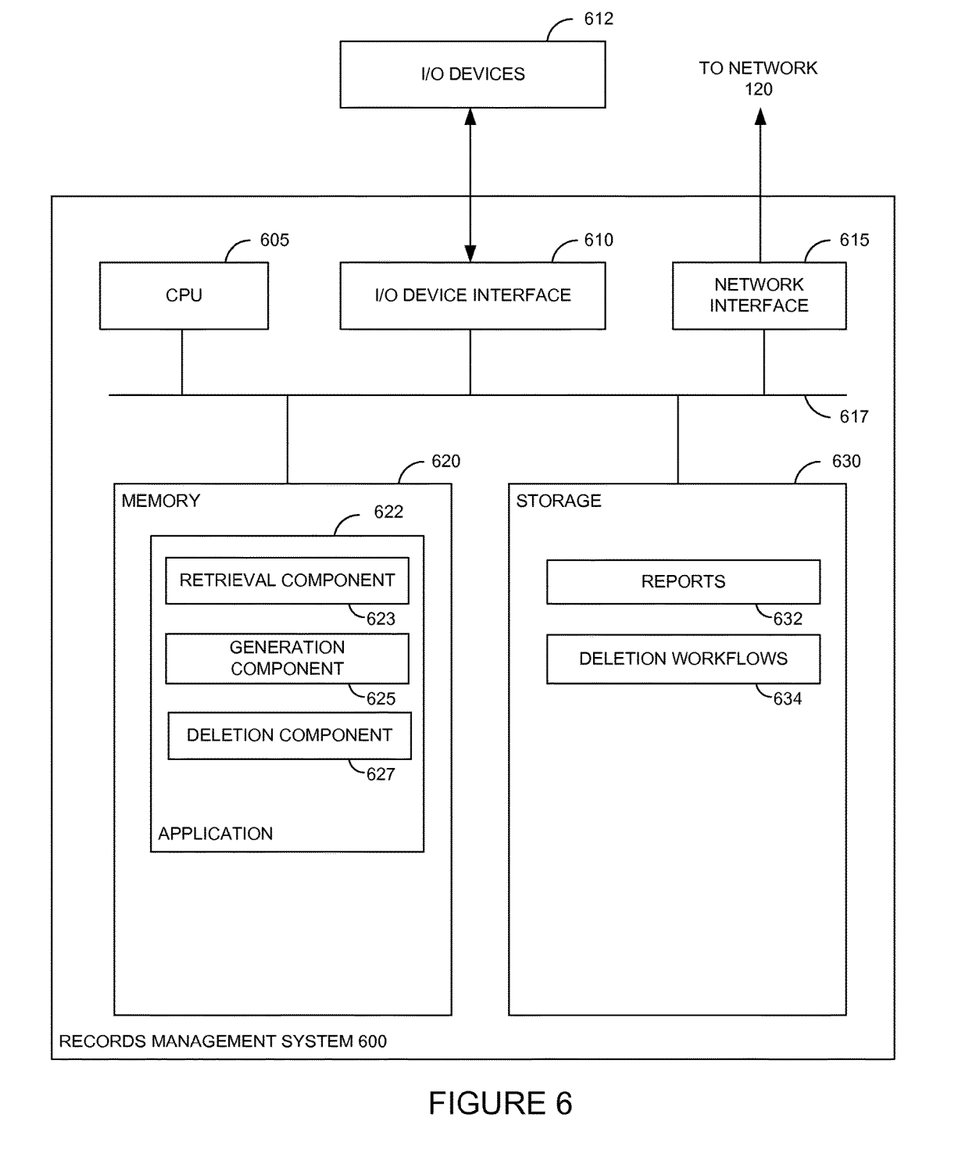
FIG. 6 illustrates a records management system configured to generate document retention reports and perform deletion workflows, according to one embodiment.

FIG. 6 illustrates an example records management system 600, according to one embodiment. As shown, the records management system 600 includes, without limitation, a central processing unit (CPU) 605, a network interface 615, an interconnect (i.e., bus) 617, a memory 620, and storage 630. The records management system 600 also may include an I/O device interface 610 connecting I/O devices 612 (e.g., keyboard, display, and mouse devices) to the ETL records management system 600.

The CPU 605 may retrieve and execute programming instructions stored in the memory 620. Similarly, the CPU 605 may retrieve and store application data residing in the memory 620. The interconnect 617 may facilitate transmission, such as of programming instructions and application data, among the CPU 605, I/O device interface 610, storage 630, network interface 615, and memory 620. CPU 605 is included to be representative of a single CPU, multiple CPUs, a single CPU having multiple processing cores, and the like. Additionally, the memory 620 is included to be representative of a random access memory. Furthermore, the storage 630 may be a disk drive storage device. As shown, the memory 620 includes the application 622.

Although shown as a single unit, the storage 630 may be a combination of fixed and/or removable storage devices, such as fixed disc drives, floppy disc drives, tape drives, removable memory cards or optical storage, network attached storage (NAS), or a storage area-network (SAN). As shown, the storage 630 includes reports 632 and deletion workflows 634.

The application 622 is generate reports 632 and perform deletion workflows 634. The application itself includes a retrieval component 623, a generation component 625, and a deletion component 627. The retrieval component 623 obtains records and associated information from containers in an enterprise records depository. The generation component 210 processes the records and generates the reports 632. The reports 632 may list records of a given container that are scheduled to be deleted after a certain period of time. The deletion component 627 initiates a deletion workflow associated with a report 632 created by the generation component 625. The deletion component 627 removes records lists in the report 632 according to policies associated with the container.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access application 106 or related data available in the cloud. For example, the application 106 could execute on a computing system in the cloud and generate document retention reports and perform deletion workflows associated with the reports. In such a case, the application 106 may store the reports at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for enforcing a document retention policy, the computer-implemented method comprising:

Identifying, by a records management application, records in a container subject to deletion based on the document retention policy and not subject to any deletion hold, each record having a respective record globally unique identifier (GUID), wherein the identified records are associated with a record set GUID; and initiating, by operation of one or more computer processors, a record deletion workflow to delete one or more of the identified records associated with the record set GUID, by providing, to the record deletion workflow, the record set GUID in lieu of any record GUID and in order to improve a capability of the records management application to, in terms of workflow execution efficiency, scale with a total count of the identified records associated with the record set GUID, wherein the record deletion workflow comprises, upon determining that a retention period for retaining a first record of the identified records has elapsed and that a deletion hold has not been placed on the first record since the first record was identified, deleting the first record.

2. The computer-implemented method of claim 1, wherein the record deletion workflow further comprises:
   determining that the document retention policy has been modified; and
   upon determining that a record of the identified records remains subject to deletion under the modified document retention policy, deleting the record.

3. The computer-implemented method of claim 1, wherein output is generated conveying each of the identified records that are not deleted, the output including information associated with the respective record that is not deleted.

4. The computer-implemented method of claim 1, further comprising generating output identifying each of the identified records by a corresponding document identifier.

5. The computer-implemented method of claim 1, wherein the document retention policy specifies attributes used to evaluate whether a given record is subject to the document retention policy and the retention period for retaining the given record.

6. The computer-implemented method of claim 1, wherein the record set GUID is passed as a parameter to the record deletion workflow without the record GUID associated with any of the respective identified records being passed to the record deletion workflow, wherein the record deletion workflow further comprises parsing the output to identify the records subject to deletion by the record deletion workflow.

7. The computer-implemented method of claim 6, wherein the record set GUID being passed as a parameter to the record deletion workflow without the record GUID associated with any of the respective identified records being passed to the record deletion workflow results in a reduction in the amount of data passed to the record deletion workflow.

8. The computer-implemented method of claim 7, wherein the record set GUID being passed as a parameter to the record deletion workflow without the record GUID associated with any of the respective identified records being passed to the record deletion workflow further results in a reduction in one or more of: processor usage, memory usage, and network bandwidth usage.

9. The computer-implemented method of claim 1, further comprising generating output conveying each of the identified records as being subject to deletion, the output including information associated with the respective record, wherein the information includes at least a filename and a location;
   wherein the first record is deleted even absent any user input specifying whether to delete the first record responsive to the output, in order to prevent the document retention policy from being circumvented by mere absence of user input specifying whether to delete the first record.

10. The computer-implemented method of claim 9, wherein the records in the container are identified at least a specified period of time prior to the retention period elapsing, wherein the deletion hold for a given record specifies an override of the document retention policy for the given record, wherein the output conveying that the given record was deleted includes information associated with the deleted record;
   wherein each GUID is of a plurality of GUIDs, wherein the capability of the records management application to scale with the total count of the identified records associated with the record set GUID is improved by avoiding: passing, via separate invocations of the record deletion workflow, the entirety of the plurality of GUIDs to the record deletion workflow.

11. The computer-implemented method of claim 10, wherein upon determining that the retention period has elapsed and that a deletion hold has been placed on a second record from the identified records since the second record was identified, the second record is not deleted, and output conveying that the second record was not deleted is generated;
   wherein upon determining that the retention period has elapsed and that the document retention policy has been changed since a third record from the identified records was identified and such that the third record is no longer subject to deletion, the third record is not deleted, and output conveying that the third record was not deleted is generated, wherein the first, second, and third records are distinct records, wherein each output is displayed.

12. The computer-implemented method of claim 11, wherein the records management application has a plurality of components including:
   a retrieval component configured to identify the records in the container subject to deletion based on the document retention policy;
   a generation component configured to generate output conveying each of the identified records as being subject to deletion; and
   a deletion component configured to initiate the record deletion workflow associated with the record set GUID to delete the one or more of the identified records.

13. The computer-implemented method of claim 12, wherein the records are stored in a records depository, wherein the record set GUID is passed to the record deletion workflow in lieu of passing each individual record GUID, in order to reduce an amount of data passed to the record deletion workflow, thereby reducing utilization of processor, memory, and network resources.

14. The computer-implemented method of claim 13, wherein the output conveying each of the identified records as being subject to deletion is stored by the records management application, wherein the stored output is subsequently parseable by the deletion component to ascertain records subject to deletion without having to incur any processing overhead of re-identifying the records subject to deletion;
   wherein the document retention policy specifies attributes used to evaluate whether the given record is subject to the document retention policy and the retention period for retaining the given record.

15. The computer-implemented method of claim 1, further comprising generating output conveying each of the identified records as being subject to deletion, the output including information associated with the respective record, wherein the information includes at least a filename and a location, wherein the first record is deleted even absent any user input specifying whether to delete the first record responsive to the output.

16. The computer-implemented method of claim 1, wherein the records in the container are identified at least a specified period of time prior to the retention period elapsing.

17. The computer-implemented method of claim 1, wherein the deletion hold for a given record specifies an override of the document retention policy for the given record.

18. The computer-implemented method of claim 1, wherein the record deletion workflow further comprises:
   generating output conveying that the given record was deleted, the output including information associated with the deleted record.

19. The computer-implemented method of claim 1, wherein upon determining that the retention period has elapsed and that a deletion hold has been placed on a second record from the identified records since the second record was identified, the second record is not deleted, and output conveying that the second record was not deleted is generated.

20. The computer-implemented method of claim 1, wherein upon determining that the retention period has elapsed and that the document retention policy has been changed since a second record from the identified records was identified and such that the second record is no longer subject to deletion, the second record is not deleted, and output conveying that the second record was not deleted is generated.

* * * * *